Figure 1:
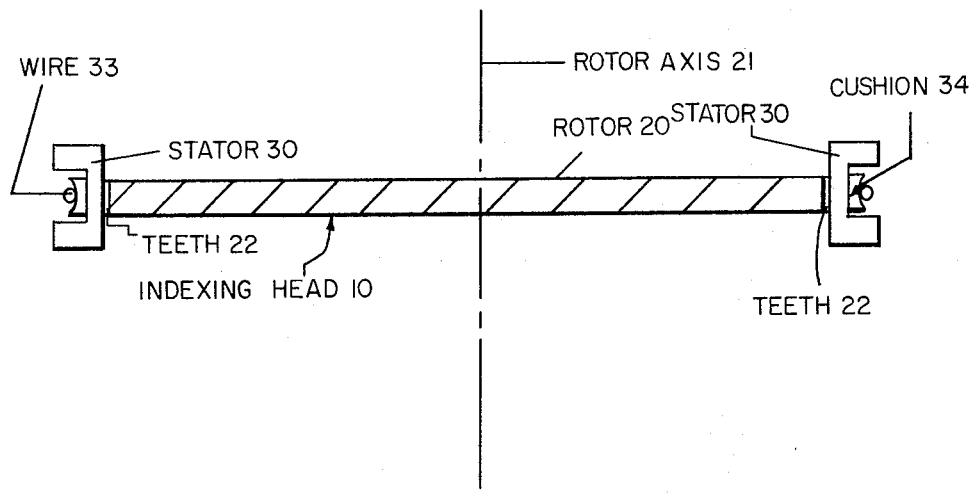

INVENTOR.
KENT E. ERICKSON
BY Peter F. Willig
ATTORNEY

United States Patent Office 3,280,658
Patented Oct. 25, 1966

3,280,658
INDEXING HEAD
Kent E. Erickson, Ridgewood, N.J., assignor to Keuffel & Esser Company, Hoboken, N.J., a corporation of New Jersey
Filed May 24, 1965, Ser. No. 458,155
4 Claims. (Cl. 74—813)

The present invention relates to angle determination and refers more particularly to a device for determining angles.

Devices for accurately determining and measuring angles are used in operation such as metal-working for precise borings. Typical devices are known as indexing heads and comprise a pair of master plates that mate together for positive locking. The plates are axially separable and are mated by means of facing radial serartions. These serrations or grooves are carefully ground so that angles accurate to one-quarter second of arc may be determined. The plates are massive to minimize distortion which affects engagement of the serrations. The weight of such plates prevents their convenient use in portable angle-determining devices such as surveying instruments. More importantly, the manufacture of these plates is difficult, since they require accurate grinding of radial grooves with subsequent broaching and lapping to reduce groove irregularities.

The present invention provides an angle-determining device which is simple to manufacture, light in weight, and suitable for use in surveying instruments. It is accurate, and adaptable for use with digital electronic read-out equipment.

Therefore one object of the present invention is to provide a device for determining angles, which overcomes the disadvantages of the prior art.

Another object is to provide a simple, accurate and light-weight indexing head.

Another object is to provide an indexing head which is adaptable for use with digital electronic read-out equipment.

Other objects will become apparent in the course of the following specification.

The objects of the present invention may be realized by providing means comprising a rotatable member (rotor) and a stationary member (stator), one of which is elastic. These members may be provided with brush contacts for use with digital electronic read-out equipment.

The present invention will appear more clearly from the following detailed description when taken in connection with the accompanying drawing showing, by way of example, a preferred embodiment of the inventive idea.

Figure 2:
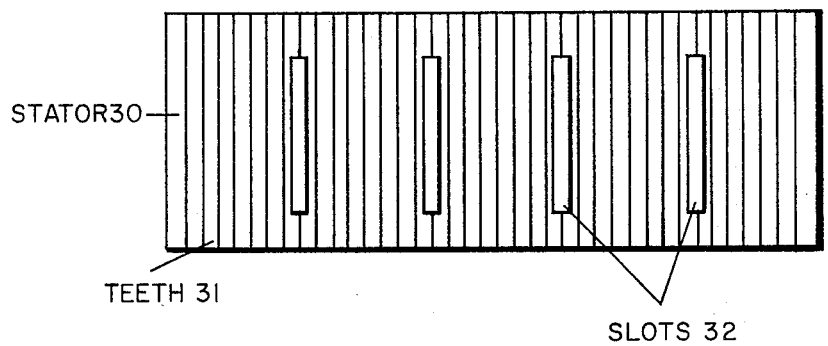

In the drawing:

FIGURE 1 is a sectional side view of one embodiment of the persent invention; and FIGURE 2 is an interior face view of part of a stator of the present invention.

In FIGURE 1, indexing head 10 comprises a rotatable member (rotor) 20 and a stationary member (stator) 30. Rotor 20 rotates about axis 21 and has external gear teeth 22 on its circumference. A suitable rotor for example, has a diameter of 5½ inches with 2¹⁰ external teeth (approximately sixty teeth per inch) and is composed of suitable material such as soft steel and may be wheel-shaped to further reduce weight.

The stator 30 is a flexible ring or short cylinder section encircling the rotor 20. It is held stationary with respect to rotor 20. A portion of the inner face of stator 30 in FIGURE 2 has teeth 31 corresponding with that of the rotor 20. Approximately 128 longitudinal slots 32 evenly spaced around the cylinder increase the elasticity so as to allow the stator 30 to be constricted so that its teeth evenly engage the teeth 22 of the rotor 20. The constricting mechanism in FIGURE 1 may be simply a wire 33 in the form of a noose over a thin cushion 34 of material such as polytetrafluoroethylene. Many alternative constricting mechanisms such as tapes and coiled springs are also suitable. A pilot plunger (not shown) may be used to align the two sets of teeth with each other before the cylinder is constricted. One set of teeth may be coated with polytetrafluoroethylene or the entire stator 30 may comprise polytetrafluoroethylene or similar material instead of metal to facilitate uniform engagement of the teeth. It is desirable that the spacing of teeth 22 and teeth 31 be small so that a better averaging effect from a large number of teeth is obtained, less relative motion of the stator and rotor is required to engage teeth 31 and teeth 22, and the increment between discrete positions of the rotor relative to the stator becomes smaller.

In conventional indexing heads two sets of radial grooves are engaged with an axial motion, whereas in the present invention two sets of grooves (or "teeth") with a cylindrical geometry are engaged with a radial motion. The result is a simple light-weight indexing head suitable for use in surveying instruments.

The present invention provides several major advantages over conventional indexing heads. For example, the geometry lends itself better to mass production of the rotor teeth by a simple broaching operation. Furthermore, the geometry lends itself to precision lapping of the teeth using the "Principle of Multiple Constraint" (see "Progress Report on the Defraction Grading Arts," by John Strong, Office of Naval Research (Contract No. 6 ONR–243, Task Order II, November 1948)). The "Principle of Multiple Constraint" operates more effectively in the actual use of the indexing head since one high tooth (or a dust particle) does not disengage neighboring teeth to the extent that would occur in a conventional indexing head. The accuracy is not greatly affected by flexure of the head, hence it can be much thinner and lighter than in the case where axial engagement of the teeth is used. Disengagement of the teeth requires no motion of the movable head or the fixed head along the axis of rotation. This permits greater freedom in the design of the bearings and in the use of the indexing head.

It is readily apparent that the presnet indexing head 10 is simple in design and amendable to mass production techniques for use in transits and check-out tables. Massive plates are eliminated.

It should be evident that the outer member may be either the rotor or the stator, and that the inner member is the corresponding stator or rotor. The rotor may be locked or immobilized or it may be free to rotate. When the rotor is locked, it may be freed by constricting the inner member or expanding the outer member. When the rotor is free to rotate, it may then be locked by expanding the inner member or constricting the outer member. Thus, at least one member must be elastic and at least one member must be rotatable. The rotor may be an elastic inner member or an elastic outer member. The stator may also be the elastic inner member or the elastic outer member. The elasticity or flexibility of the elastic member is increased by the presence of slots or cutouts regularly spaced among the teeth. Locking or immobilization is achieved by engagement of the facing teeth.

To give 19-bit resolution (2.5 arc seconds), a tangent adjustment may be provided by means of a tangent screw to sub-divide each division into 512 parts. Since the range required on the tangent motion is very small, this motion may operate about a flexure pivot to provide stability of the axis. To provide electrical output, a contact may be activated by the rotor teeth to operate an electronic computer. Five-hundred-twelve "fine" counts between each of the "coarse" counts may be obtained in a similar manner from a second contact operated by the tangent screw. Actually two contacts are required for both the "coarse" and the "fine" counters so as to provide directional information to a reversible counter in a conventional manner.

The described example is capable of many variations and modifications. All such variations and modifications are to be included within the scope of the present invention.

What is claimed is:

1. An indexing head comprising:
    (a) a first hollow circular cylindrical member having a set of teeth disposed longitudinally on the inner surface thereof, said first member having a normal inner diameter;
    (b) a second circular cylindrical member positioned within said first member on a common geometrical axis therewith and having a set of teeth disposed longitudinally on the outer surface thereof;
    (c) said second member having a normal outer diameter less than said normal diameter of said first member, thereby providing for unrestricted relative rotational movement between said members about said axis while both members are in a normal condition;
    (d) one of said members being deformable alternately between said normal diameter and a second diameter, the deformation to said second diameter resulting in engagement of said teeth sets;
    (e) means mounting one of said members for rotation about said axis;
    (f) means fixing the other of said members against rotation; and
    (g) means for deforming said deformable member while retaining its circular form, alternately to engage and disengage said teeth sets, whereby said one member is alternately fixed and rotatable.

2. An indexing head according to claim 1 wherein said first member is fixed with respect to rotation about said axis and is deformable to a second lesser diameter.

3. An indexing head according to claim 2 wherein:
    (a) said deforming means comprises a constricting element engaging said first member; and
    (b) said first member is elastically biased toward said normal diameter, whereby upon release of said constricting element said member will regain the greater diameter.

4. An indexing head according to claim 1 wherein said second member is fixed with respect to rotation about said axis and is deforamble to a second greater diameter.

References Cited by the Examiner

UNITED STATES PATENTS 2,857,777   10/1958   Porter _____ 74—411 X

LEONARD FORMAN, *Primary Examiner.*

S. S. MATTHEWS, *Assistant Examiner.*